US010374712B2

(12) United States Patent
Cook

(10) Patent No.: US 10,374,712 B2
(45) Date of Patent: *Aug. 6, 2019

(54) DISTRIBUTED OUTDOOR NETWORK APPARATUS AND METHODS

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,173

(22) Filed: Nov. 15, 2017

(65) Prior Publication Data

US 2018/0076897 A1 Mar. 15, 2018

Related U.S. Application Data

(63) Continuation of application No. 15/230,183, filed on Aug. 5, 2016, now Pat. No. 9,843,393, which is a (Continued)

(51) Int. Cl.
*H04B 10/00* (2013.01)
*H04B 10/2575* (2013.01)
(Continued)

(52) U.S. Cl.
CPC . *H04B 10/25753* (2013.01); *H04B 10/25752* (2013.01); *H04B 10/806* (2013.01);
(Continued)

(58) Field of Classification Search
CPC ............................ H04B 10/2575; H01B 9/005
(Continued)

(56) References Cited

U.S. PATENT DOCUMENTS 2,434,263 A 1/1948 Diamond et al.
5,404,148 A 4/1995 Zwarts
(Continued)

FOREIGN PATENT DOCUMENTS

EP 1198024 A1 4/2002
WO WO-2011-153450 12/2011

OTHER PUBLICATIONS

International Search Report and Written Opinion prepared by the U.S. Patent and Trademark Office as International Searching Authority for PCT International Patent Application No. PCT/US11/39094 dated Oct. 14, 2011; 27 pages.
(Continued)

*Primary Examiner* — Agustin Bello

(57) ABSTRACT

Tools and techniques for providing robust wireless distribution of communications signals from a provider. Certain embodiments comprise one or more modular communications apparatuses. The modular communications apparatuses feature an enclosure which is, at least in part, transparent to radio frequencies. A modular communications apparatus also typically includes one or more communications radios or transmitter/receiver devices within the enclosure. The apparatus also includes at least one and possibly more than one antenna located within the enclosure along with wire or cable-based signal output apparatus.

16 Claims, 9 Drawing Sheets

Related U.S. Application Data continuation of application No. 14/703,022, filed on May 4, 2015, now Pat. No. 9,438,344, which is a continuation of application No. 13/764,482, filed on Feb. 11, 2013, now Pat. No. 9,054,810.

(51) Int. Cl.
*H04B 10/80* (2013.01)
*H04Q 11/00* (2006.01)
*H01Q 1/24* (2006.01)
*H01B 9/00* (2006.01)

(52) U.S. Cl.
CPC ......... *H04Q 11/0067* (2013.01); *H01B 9/005* (2013.01); *H01Q 1/246* (2013.01)

(58) Field of Classification Search
USPC .......................................... 398/115, 66–74
See application file for complete search history.

(56) References Cited

U.S. PATENT DOCUMENTS 5,570,546 A 11/1996 Butterworth et al.
5,963,178 A * 10/1999 Jones .................... H01Q 1/06 343/890
6,447,150 B1 9/2002 Jen et al.
6,665,968 B2 12/2003 Jen
6,952,530 B2 * 10/2005 Helvajian ................ B64G 1/10 385/14
7,004,043 B2 2/2006 Erel et al.
7,536,106 B2 * 5/2009 Bloom ............... H04B 10/1125 398/121
7,557,771 B1 7/2009 Hodges
7,561,895 B1 * 7/2009 Hohnstein ............ H01Q 1/1207 455/403
7,956,817 B2 6/2011 Hager
8,018,395 B2 9/2011 Hager
8,085,211 B2 12/2011 Yang et al.
8,175,648 B2 * 5/2012 Johnson ................. H01Q 1/246 455/562.1
8,193,983 B1 * 6/2012 Farmer .................... H01Q 3/06 342/367
8,203,501 B2 * 6/2012 Kim ....................... H01Q 1/246 343/872
8,289,224 B2 * 10/2012 Halkiopoulos ...... H01Q 1/1242 343/872
8,373,612 B2 * 2/2013 Cook ................... H01Q 1/1242 343/874
8,403,302 B2 3/2013 Erel et al.
8,599,100 B2 * 12/2013 Cook ................... H01Q 1/1242 343/878
8,836,607 B2 * 9/2014 Cook ................... H01Q 1/1242 343/878
9,054,810 B2 * 6/2015 Cook ............... H04B 10/25752
9,438,344 B2 * 9/2016 Cook ............... H04B 10/25752
9,837,698 B2 * 12/2017 Lasier ...................... H01Q 1/06
9,843,393 B2 * 12/2017 Cook ............... H04B 10/25752
10,044,092 B2 * 8/2018 Caldwell .............. H01Q 1/1242
2002/0068612 A1 * 6/2002 Carey .................... H04W 16/06 455/562.1
2004/0054425 A1 * 3/2004 Elmore ............ H04B 10/25751 700/1
2004/0196834 A1 * 10/2004 Ofek ...................... H01Q 1/246 370/352
2006/0003808 A1 * 1/2006 Haskell .................. H01Q 1/246 455/562.1
2006/0083186 A1 * 4/2006 Handforth ........... H04W 88/085 370/310
2007/0257855 A1 * 11/2007 Skalina .................. H01Q 1/246 343/797
2009/0135074 A1 * 5/2009 Yang ...................... H01Q 1/246 343/766
2009/0224998 A1 9/2009 Hager
2009/0233644 A1 * 9/2009 McCune, Jr. ........ H04B 1/0483 455/561
2009/0305710 A1 * 12/2009 Johnson ................. H01Q 1/246 455/446
2010/0231469 A1 * 9/2010 Kim ....................... H01Q 1/246 343/721
2011/0293277 A1 * 12/2011 Bradea ................... G02B 6/445 398/66
2011/0298686 A1 * 12/2011 Cook ................... H01Q 1/1242 343/872
2012/0154239 A1 * 6/2012 Bar-Sade ............ H01Q 1/1242 343/839
2012/0220339 A1 * 8/2012 Johnson ................. H01Q 1/246 455/562.1
2012/0315048 A1 * 12/2012 Beck ................ H04B 10/25758 398/98
2013/0112819 A1 * 5/2013 Cook ................... H01Q 1/1242 248/129
2014/0054436 A1 * 2/2014 Cook ................... H01Q 1/1242 248/519
2014/0065996 A1 * 3/2014 Dickie ................. H01Q 1/1242 455/269
2014/0095924 A1 * 4/2014 Holden ............... H04L 12/1895 714/4.11
2014/0226982 A1 * 8/2014 Cook ............... H04B 10/25752 398/66
2014/0345118 A1 * 11/2014 Cook ................... H01Q 1/1242 29/600
2015/0084826 A1 3/2015 Lea et al.
2015/0236787 A1 8/2015 Cook
2016/0050715 A1 * 2/2016 Porter ................... H04W 88/08 455/562.1
2016/0344479 A1 11/2016 Cook
2018/0076897 A1 * 3/2018 Cook ............... H04B 10/25752

OTHER PUBLICATIONS

International Preliminary Report on Patentability prepared by the International Bureau of WIPO for PCT International Patent Application No. PCT/US11/39094 dated Dec. 13, 2012; 7 pages.

* cited by examiner

DISTRIBUTED OUTDOOR NETWORK APPARATUS AND METHODS

CROSS-REFERENCES TO RELATED APPLICATIONS

This application is a continuation of U.S. patent application Ser. No. 15/230,183, filed Aug. 5, 2016 by Charles I. Cook and titled, "Distributed Outdoor Network Apparatus and Methods", which is a continuation of U.S. patent application Ser. No. 14/703,022 (now U.S. Pat. No. 9,438,344), filed May 4, 2015 by Charles I. Cook and titled, "Distributed Outdoor Network Apparatus and Methods", which is a continuation of U.S. patent application Ser. No. 13/764,482 (now U.S. Pat. No. 9,054,810), filed Feb. 11, 2013 by Charles I. Cook and titled, "Distributed Outdoor Network Apparatus and Methods", the entire teachings of which are hereby incorporated by reference in their entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to communications service provider networks, and more particularly, to tools and techniques that enable a service provider to distribute communications signals locally from a modular communications apparatus to one or more customer premises after distributing the communications signals regionally over an optical fiber network.

BACKGROUND

"Fiber to the curb" (FTTC) refers to the deployment of broadband optical communications fibers from a central office or a regional switch location to locations reasonably close to but not within customer premises. For example, a telecommunications or other network utilizing FTTC might feature optical fiber placed within the utility easement along the streets or sidewalks outside of customer premises. Typically, another medium such as coaxial cable or twisted-pair wires is used to carry communications signals from the optical fiber network the short distance between the curb and customer owned devices or customer managed networks inside nearby home or business premises.

The optical fiber backbone of an FTTC implementation can carry telephone signals, television signals, on-demand media, high-bandwidth data signals and other digital signals. Unfortunately, many existing conduits from the curb to the customer such as twisted-pair telephone wires have dramatically less capacity than the optical fiber at the curb. This imbalance results in significantly reduced bandwidth and performance at the customer premises. Higher bandwidth links between each customer and the curb, for example, dedicated lateral fiber optic lines, can be too expensive for reasonable implementation and involve significant retrofit costs to update existing wires. These issues, and others, compromise a provider's ability to effectively implement FTTC signal distribution networks. Hence, there is a need for solutions that can overcome the technical hurdles of relatively inexpensively and conveniently conveying high-bandwidth communications signals from an optical fiber "at the curb" (or otherwise near multiple customer premises) to communications devices or networks located within the customer premises.

BRIEF SUMMARY

One set of embodiments includes tools and techniques to enable the robust wire-based and wireless distribution of communications signals from a provider to multiple customer premises. Certain embodiments comprise modular communications apparatuses which are located near to customer premises. For example, a modular communications apparatus could be implemented as an inconspicuous device located near 1, 2, 3, 5, 10 or more customer premises. Each modular communications apparatus features an enclosure which is, at least in part, transparent to radio frequencies. A modular communications apparatus also typically includes one or more communications radios or transmitter/receiver devices within the enclosure. The apparatus also includes at least one and possibly more than one antenna located within the enclosure.

The antenna or antennas plus the upstream signal processing components provide for a modular communications apparatus to transmit a wireless communications signal to multiple wireless devices located within multiple customer premises located near the modular communications apparatus. The apparatus also includes a wired communications switch within the enclosure. The wired communications switch includes a wired signal output and is therefore configured to provide wired communications signals to wire or cable-input communications devices located within the multiple customer premises.

The apparatus further includes supporting electronic and optical components including but not limited to; a fiber management module configured to receive an input optical communications signal and a media converter configured to convert the input optical communications signal to an electrical communication signal. The electrical communication signal may then be communicated to the wired or wireless outbound communications components. The modular communications apparatus will typically also include at least a power converter module or modules and a base supporting the enclosure.

Alternative embodiments include methods of distributing communications signals from a provider to multiple customer premises using the apparatus described above. The methods feature, but are not limited to, communicating one or more electrical communication signals through a cable or other wire-based medium to multiple customer premises and transmitting one or more wireless communications signals from one or more antennas to multiple wireless devices located within multiple customer premises. In each case, the wired and wireless signals are transmitted or distributed to customer premises from one or more modular communications apparatus located nearby, as described above.

Another set of representative embodiments include communications systems including, but not limited to, multiple modular communications apparatuses as described herein.

In the various apparatus, method and system embodiments, the modular communications apparatuses may comprise two or more vertically stacked enclosure modules. At least one of the enclosure modules will be transparent to radio frequencies. For example, the uppermost enclosure module may be transparent to radio frequencies. The modular communications apparatuses may also include multiple integrated height extension joints connecting adjacent enclosure modules.

The electronic components of a modular communications apparatus as described herein may be implemented with any suitable componentry. For example, the wired communications switch may be implemented with an Ethernet switch, a mini D-SLAM or other suitable device(s). The communications radio or transmitter/receiver device or devices may be implemented with a Wi-Fi radio, an LTE radio, a VDSL2 radio, a G fast radio an ONU radio or other suitable devices. Power to the modular communications apparatus may be input to the power converter module from a local power feed, power from a customer premises, with power over a network or other suitable power source.

In system and method embodiments, the system may include multiple modular communications apparatuses distributed over a service area providing wireless and wired communications services to more customers than can be serviced by a single modular communications apparatus.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
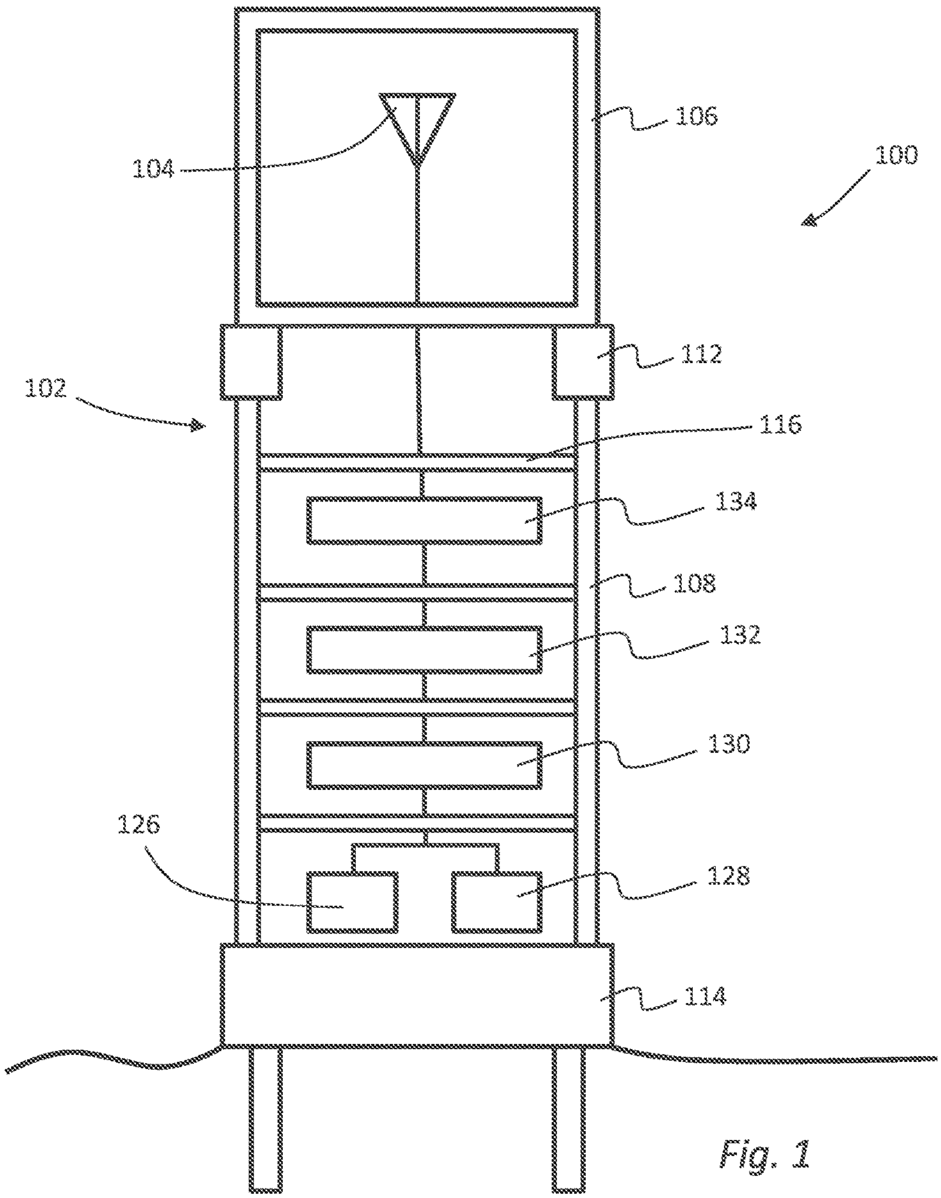
FIG. 1 is a schematic diagram of a modular communications apparatus, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments disclosed herein address the technical difficulties, cost and other problems associated with conveying communications signals of any type from a "fiber to the curb" (FTTC) network to various types of devices or local networks within nearby customer premises. Generally, the embodiments disclosed herein feature the use of a modular communications apparatus or "pillar" which receives communication signals from a regional distribution point, through an optical fiber. The modular communications apparatus then transmits communication signals to one (or typically several) customer premises after any necessary signal conversion steps. The communications signals may be transmitted from the modular communications apparatus to devices or networks within the customer premises either wirelessly, over a wire such as a coaxial cable, a data cable or a twisted-pair telephone communications cable or over an optical fiber. In certain implementations, multiple alternative transmission media, for example wireless transmission plus wired signal communication may be implemented between one modular communications apparatus and various customer premises. Thus, the disclosed communications apparatus provides a great deal of flexibility to a service provider concerned with efficiently and effectively transmitting high-bandwidth communication signals from a FTTC optical network to multiple customer premises.

One particular embodiment of modular communications apparatus 100 is illustrated in FIG. 1. The modular communications apparatus 100 will be located outside of, but relatively near, one or more customer premises. For example, the modular communications apparatus 100 may be located outside of, but within 1 to 1000 feet of one or typically several customer premises.

The modular communications apparatus 100 includes an enclosure 102 which may be composed of multiple sections or a single section. As described in detail below, the modular communications apparatus 100 provides for wireless communications between one or more apparatus antennas 104 and one or more customer premises. Therefore, if the enclosure 102 is implemented in a single section the enclosure must be transparent to RF transmissions. In embodiments where multiple sections are used to implement the enclosure 102, only the enclosure sections housing antennas must be RF transparent. Radio-opaque materials can be used for enclosure sections which do not house internal antennas 104. In the specific embodiment illustrated in FIG. 1, the enclosure 102 includes an upper section 106 and a lower section 108. The upper section 106 houses an antenna 104 and is therefore fabricated from an RF transparent material.

Figure 2:
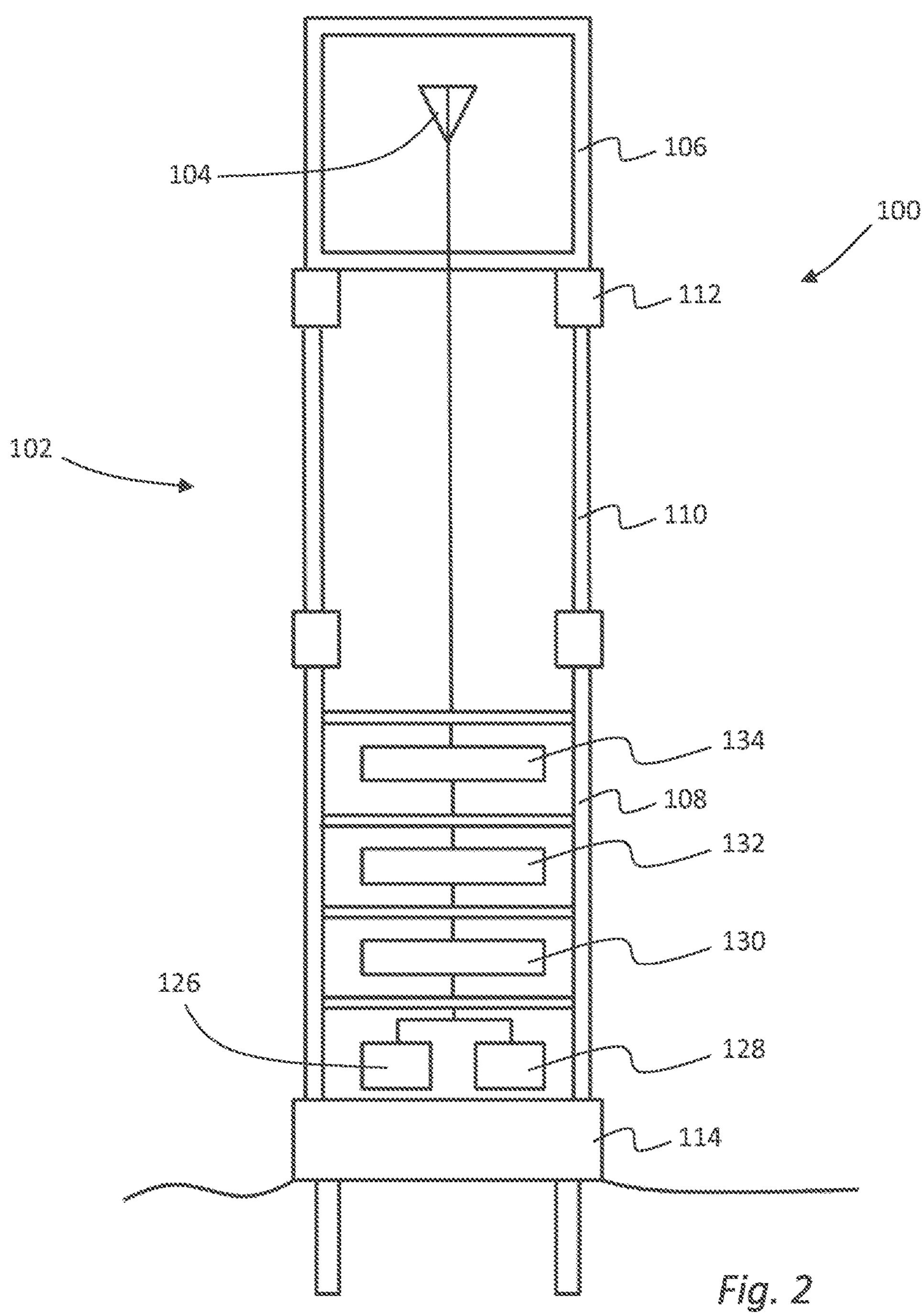
FIG. 2 is a schematic diagram of a modular communications apparatus featuring an enclosure extension.

FIG. 2 illustrates a variation of the modular communications apparatus 100 which is substantially identical to the FIG. 1 embodiment with the exception of an additional vertically stacked enclosure section 110 positioned between the upper enclosure section 106 and lower enclosure section 108. Inclusion of one or more additional enclosure sections 110 provides a convenient way to selectively adjust the height of the antenna element 104 above the ground. In this manner, the wireless coverage range of a modular communications apparatus 100 may be enhanced or adjusted as described in detail below. Both FIG. 1 and FIG. 2 illustrate apparatus enclosures 102 which have height extension joints 112 incorporated into the enclosure sections at convenient locations. The height extension joints 112 may be separate elements or can be integrated with the enclosure sections. In either case, the height extension joints provide a convenient means for adjusting the overall height of a modular communications apparatus 100 and thereby adjusting the height of any internal antenna 104.

The modular communications apparatus 100 may be implemented with an enclosure 102 which is cylindrical, rectangular or of any other cross sectional shape. Any provided upper section 106 may or may not have the same dimensions or shape as lower sections. In one embodiment, the enclosure 102 is implemented as a cylindrical pillar having an outside diameter of approximately 8 inches and any suitable height as determined by the number of vertically stacked enclosure modules included.

The modular communications apparatus 100 and will typically also include a base 114 supporting the enclosure 102. The base may be fabricated from metal, concrete, plastic or other suitable material. Alternatively, the base may have multiple sections, for example a concrete foundation and metal base plate. The base should be sufficiently stable and secured to the ground in a suitable manner to permanently or semi-permanently anchor the apparatus enclosure 102 to the ground or pavement. The base 114 may include holes or conduits providing for buried optical fiber or other communications media to pass up through the base and into the interior of the apparatus enclosure 102.

Figure 3:
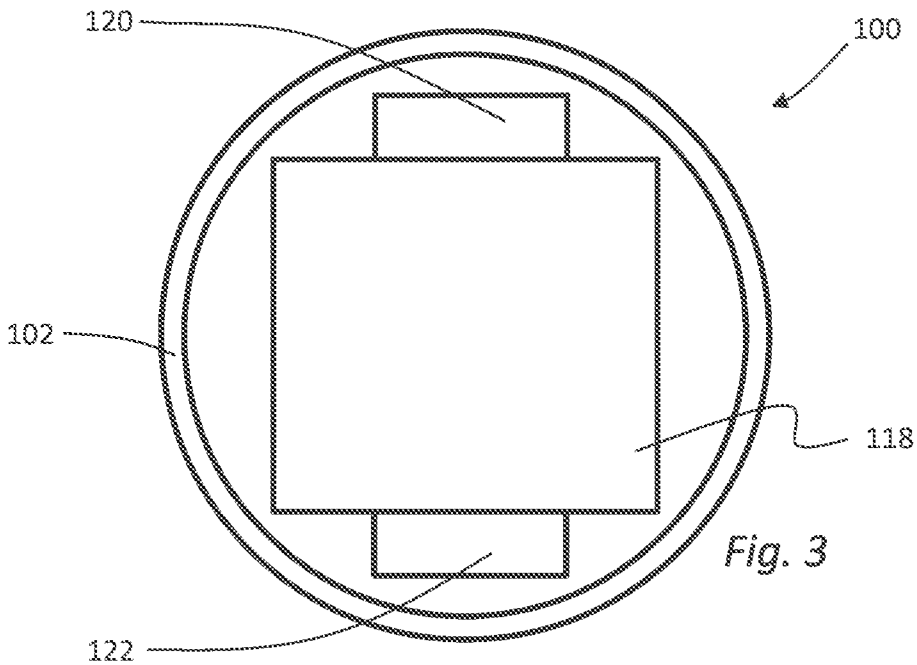
FIG. 3 is a plan view schematic diagram of the modular communications apparatus of FIG. 1.

Together, the base 114 and enclosure 102 elevate the antenna(s) 104 and protect various internal electronic devices from weather, vandalism or other damage. The base 114 and enclosure 102 also will typically include access openings providing access "at the curb" for various internal electronic devices. The convenient use of the enclosure 102 may be enhanced by including one or more shelves 116 defining multiple slots to neatly house the electronic components positioned within the enclosure. As illustrated in the plan view of FIG. 3, the enclosure 102 may also include or define partitions separating the internal device region 118 from rear cabling conduits 120 and front cabling conduits 122.

Figure 4:
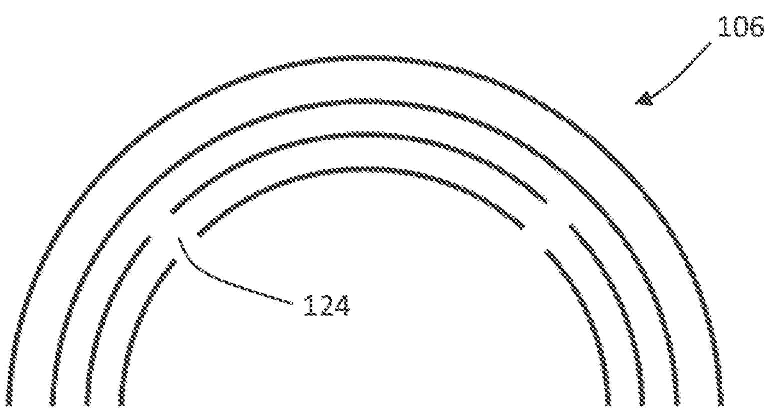
FIG. 4 is a schematic representation of an upper enclosure section.

As noted above, certain implementations will include an RF transparent upper section 106 or cap. As illustrated in FIG. 4 the upper section 106 may be implemented with a domed structure which provides effective rain and snow protection. A domed upper section 106 may include multiple structural layers with selected layers being perforated by ventilation conduits 124 to provide for ventilation while maintaining weather protection.

The electronic devices positioned within the enclosure 102 may include but are not limited to the following: a power converter module 126, a fiber management module 128, a media converter 130, a wired communications switch 132, a communications radio 134 and an antenna 104. Other communications electronics may be included as desired. Furthermore, the above listed components may be duplicated or eliminated as necessary to achieve specific curb-to-customer communications goals. Each of the above listed components is described in detail below.

The fiber management module 128 provides an optical fiber input to the modular communications apparatus 100. In use, one or typically multiple optical communication signals are input to the modular communications apparatus 100 from a regional fiber network at the fiber management module. The fiber management module 128 may also include any optical splitters or other fiber connections necessary to communicate the optical communications signal to other devices or components as described herein. Although the modular communications apparatus is well suited for use with an FTTC network, in certain alternative embodiments, the input to the modular communications apparatus 100 could be or could include a copper wire or cable. In such an implementation, the fiber management module may include or be replaced by a cable management module.

The optical communications signal received at the fiber management module 128 is conveyed to one or more media converters 130 housed within the modular communications apparatus 100. In addition, the optical signal input to the fiber management module 128 may be conveyed to one or more customer premises or additional modular communications apparatuses 100 through lateral optical fibers, as described in detail below.

The media converter element 130 converts the optical communications signal received from the fiber management module 128 into an electrical communications signal that in turn feeds other components. The signal conversion method or methods implemented by the media converter 130 will depend upon the specifications of the devices used to communicate the signals to customer premises. For example, as described in detail below, the media converter 130 may provide an electrical communications signal to a GigE Ethernet switch in communication with a wireless radio. In such an implementation, the media converter 130 may be a GPON-to-1000BASE-T, Optical GigE-to-1000BASE-T or similar Ethernet converter. The media converter 130 may alternatively be implemented with an EoCu-to-1000BASE-T converter or any other appropriate backhaul technology, for example, the media converter could also be a wireless backhaul link or other suitable technology in implementations where optical fiber is not available at the modular communications apparatus 100.

The electrical communications signal from the media converter 130 is therefore provided to one or more wired communications switches 132 located within the enclosure 102. For example, one possible wired communications switch is a multi-port GigE Ethernet switch which may be connected to one or more communications radios 134. In addition, management of the modular communications apparatus 100 and the various components contained therein may be accomplished through a communications interface associated with the switch 132. Other types of wired communications switches may be used in alternative implementations. For example, the wired communications switch 132 may be implemented with a mini D-SLAM providing for DSL communications.

The communications radios or transmitter/receivers 134 can be selected to transmit WiFi, LTE or other types of communications signals. For example, the transmitter/receiver 134 could be a VDSL2 radio, a G fast radio and an ONU radio. The term "radio" as defined herein could be any type of transmitting and receiving device. For example, VDSL2 and G.fast are technologies that run over copper. An ONU is typically an optical device. Wireless radios are typically associated with wireless communications links. The terms "transceiver" or "transmitter/receiver" device are therefore synonymous with "radio" as used herein. In certain implementations multiple types of radio or transmitter/receiver 134 may be provided within the enclosure 102. Ideally, the multiple types of transmitter/receiver devices will typically have a common switch interface for example a GigE or RJ-45 interface that allows each transmitter/receiver to be conveniently connected to the same wired communications switch 132.

The communications radio or transmitter/receivers 134 included within the modular communications apparatus enclosure provide for wireless communication, through antenna 104, with various types of wireless device or network controllers within nearby customer premises. In certain implementations, multiple antennas may be used and in some cases antennas may be stacked. Certain antennas may be directional and access openings may be made within the enclosure 102 allowing for the convenient orienting of directional antennas. As noted above, the height of any antenna or antennas 104 may be adjusted by adding or subtracting enclosure sections 110. Thus, the coverage area for the wireless communications signal or signals transmitted from each modular communications apparatus may be selected and adjusted to cover one or typically multiple customer premises. A system of modular communications apparatuses may be implemented as described below to provide services over a wide region.

Figure 5:
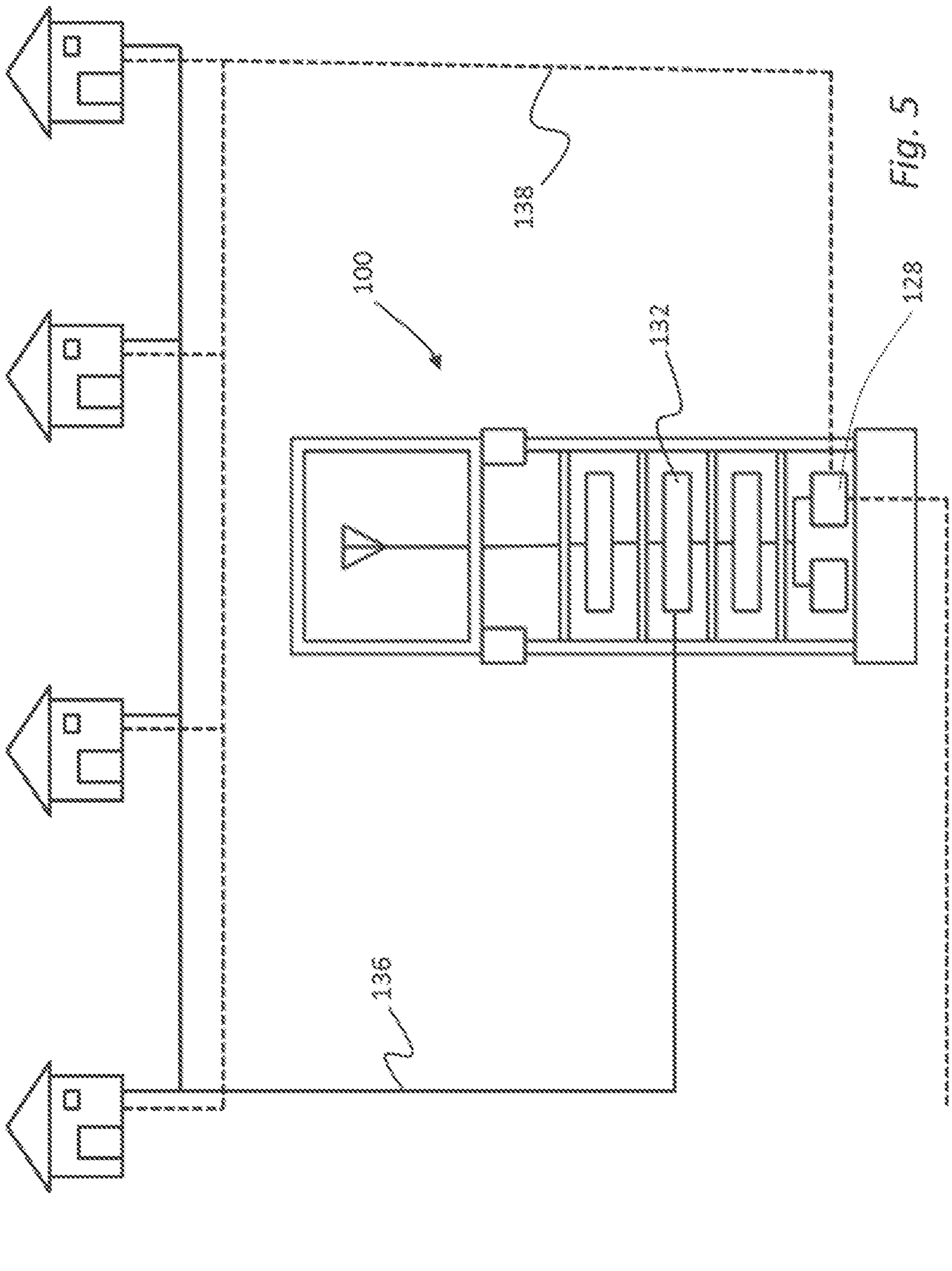
FIG. 5 is a schematic diagram of a modular communications apparatus illustrating wired, optical and wireless communications pathways between the apparatus and multiple customer premises.

The modular communications apparatus 100 therefore provides a wireless final communications link between a service provider's FTTC optical network and one or more customer's premises. In addition, as schematically illustrated in FIG. 5, the modular communications apparatus 100 may also provide a direct wired communications signal over a wire or cable 136 from the wired communications switch 132 to wired communications devices or network hubs located within the customer premises. In certain embodiments, the modular communications apparatus 100 may also provide a direct optical communications signal over optical fiber 138 to one or more optical communications devices or networks located within customer premises.

The modular communications apparatus 100 may therefore be selectively implemented to provide communication signals between a network, typically a FTTC optical network to one or more premises wirelessly, over a wire or cable, or over an optical fiber. In addition, one modular communications apparatus 100 can typically service several customer premises. Thus, the modular communications apparatus 100 provides a great deal of flexibility to service providers and customers.

Figure 6:
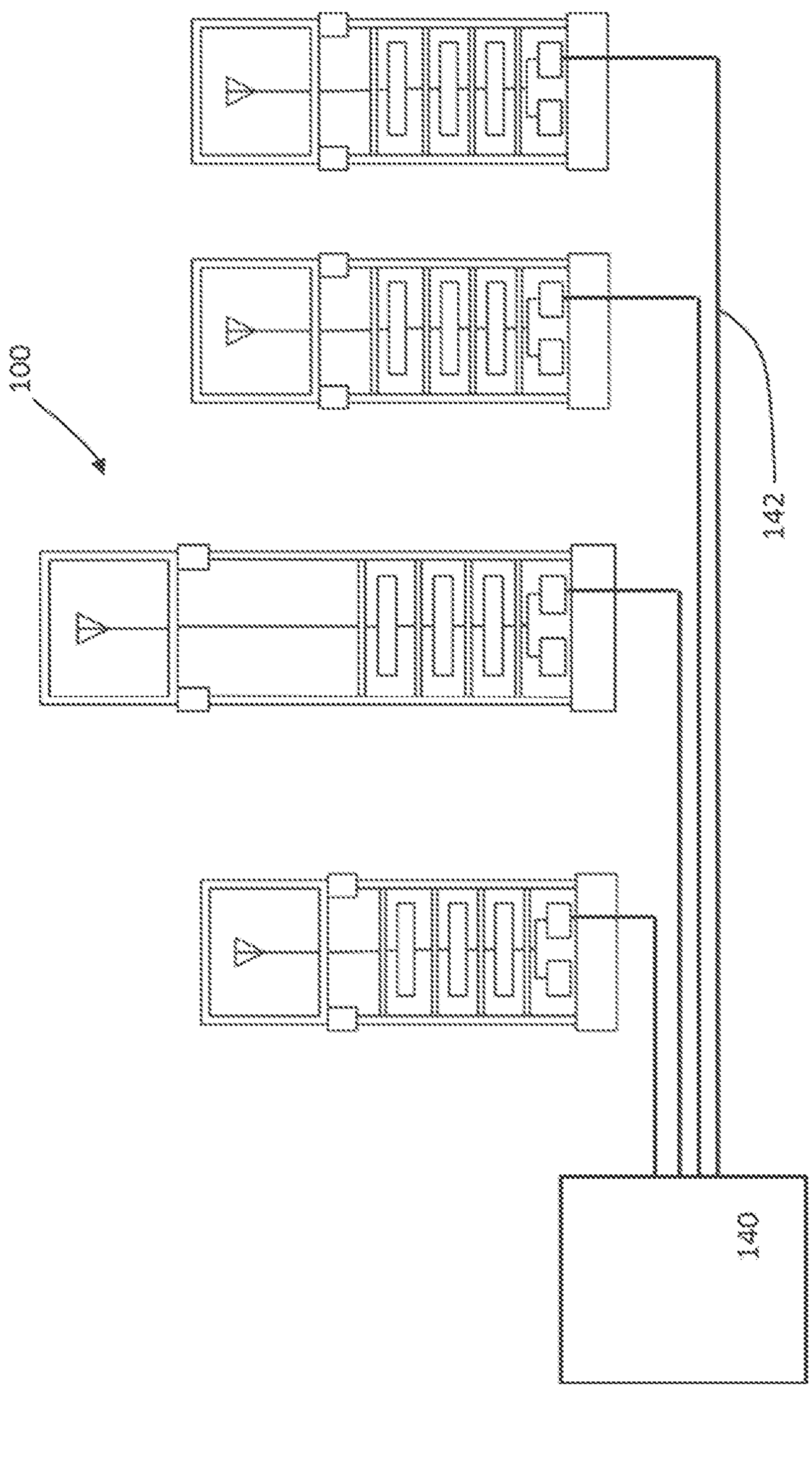
FIG. 6 is a schematic diagram of a modular communications apparatus system.
Figure 7:
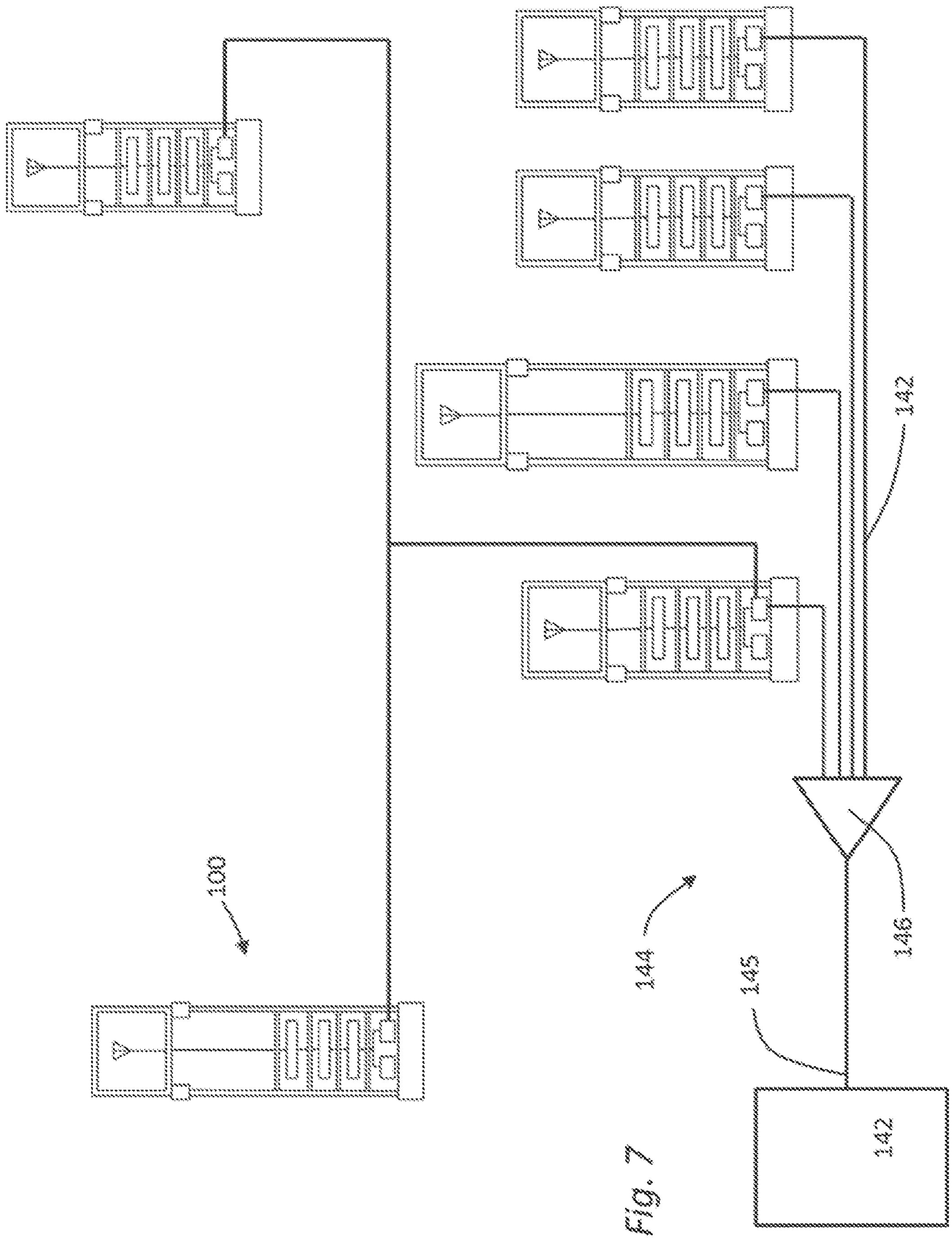
FIG. 7 is a schematic diagram of an alternative modular communications apparatus system.

Multiple modular communications apparatuses may be connected to a regional FTTC network to provide communication services to all or many customers within a given region. The number and type of antennas selected and the relative height of specific modular communication apparatus enclosures 102 may be selected to provide regional wireless coverage with substantially fewer modular communication apparatuses 100 than customers. As shown in FIG. 6, each of the multiple modular communications apparatuses 100 in a system may be in direct communication with a central office 140 or other signal distribution point, over dedicated optical fibers 142. Alternatively, as illustrated in FIG. 7, the various modular communications apparatuses 100 of a system may be connected to a central office 140 through a passive optical network 144 comprising a multifiber optical cable 145 transmitting one or many optical communications signals from the central office 140 to one or more optical splitters 146. At the optical splitter 146, the optical communications signals may be split for transmission over dedicated optical fibers 142 to various modular communications apparatuses 100 in a system. Furthermore, certain modular communications apparatuses may receive an input optical signal over a lateral optical fiber 148 originating from the fiber management module 128 of another modular communications apparatus.

Figure 8:
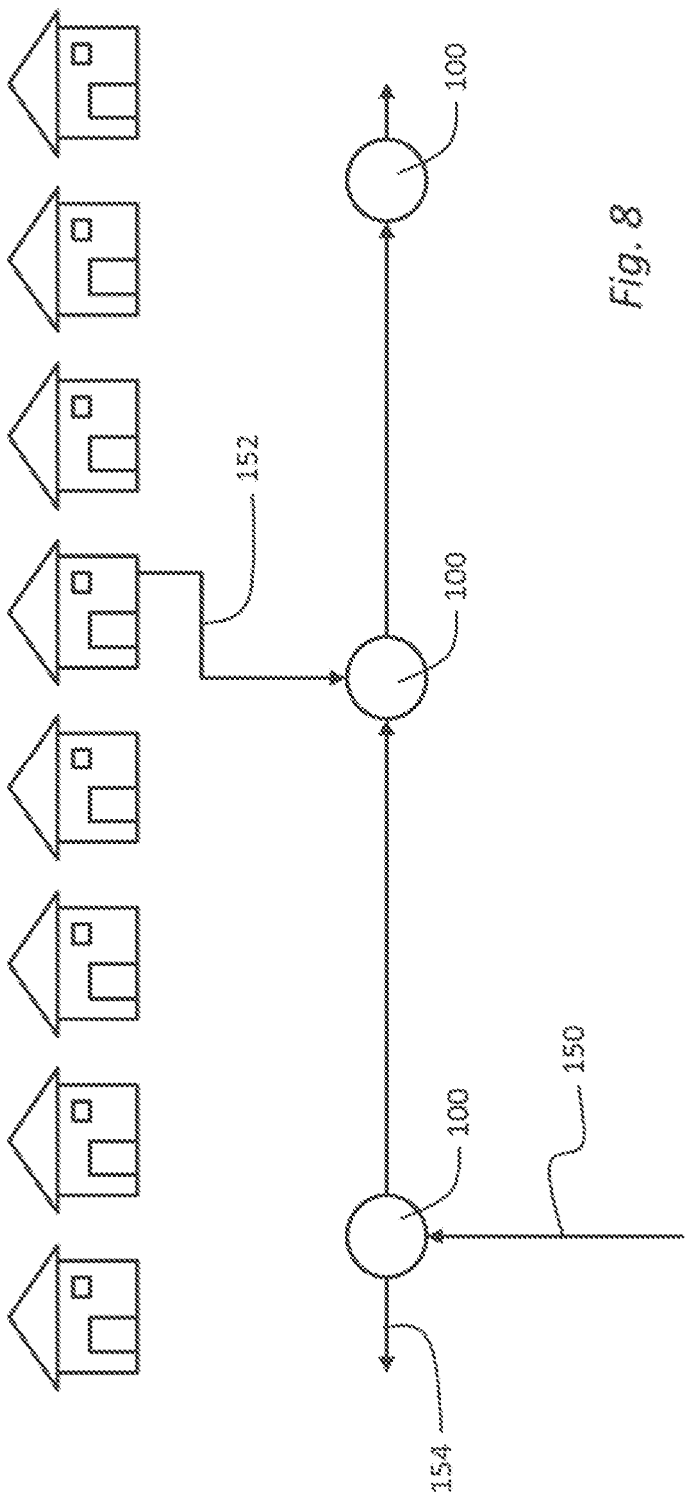
FIG. 8 is a schematic diagram of power source alternatives in a modular communications apparatus system.

Each of the modular communications apparatuses of a system will typically include a power converter module 126. The power converter module serves to supply AC or DC power to the other components included within the modular communications apparatus enclosure 102. As illustrated in FIG. 8, power may be supplied to the power conversion module 126 from many alternative or complementary sources. For example power may be supplied from a local power feed 150, through a back-power line from a customer premises or over a network 154. In certain embodiments the voltage and current characteristics of the power supplied to the electronic devices housed within a given modular communications apparatus 100 will be uniform for all devices, thereby enhancing the modularity of the apparatus.

As described in detail above, a system of modular communications apparatuses 100 may be implemented to provide communications signals from an FTTC optical network to one or often multiple customer premises. The communications signals may be of any type including but not limited to telecommunications signals, data signals or television and media signals. Some or all of the devices or networks within multiple customer premises may be in communication with a single modular communications apparatus 100. The nature and type of supported customer devices is not intended to be limited by this disclosure. Representative examples of customer devices which may communicate with a FTTC network through a modular communication apparatus system as described herein include but are not limited to, telephones, smart phones, personal digital assistants, computers, televisions, game stations, smart appliances and similar devices.

Figure 9:
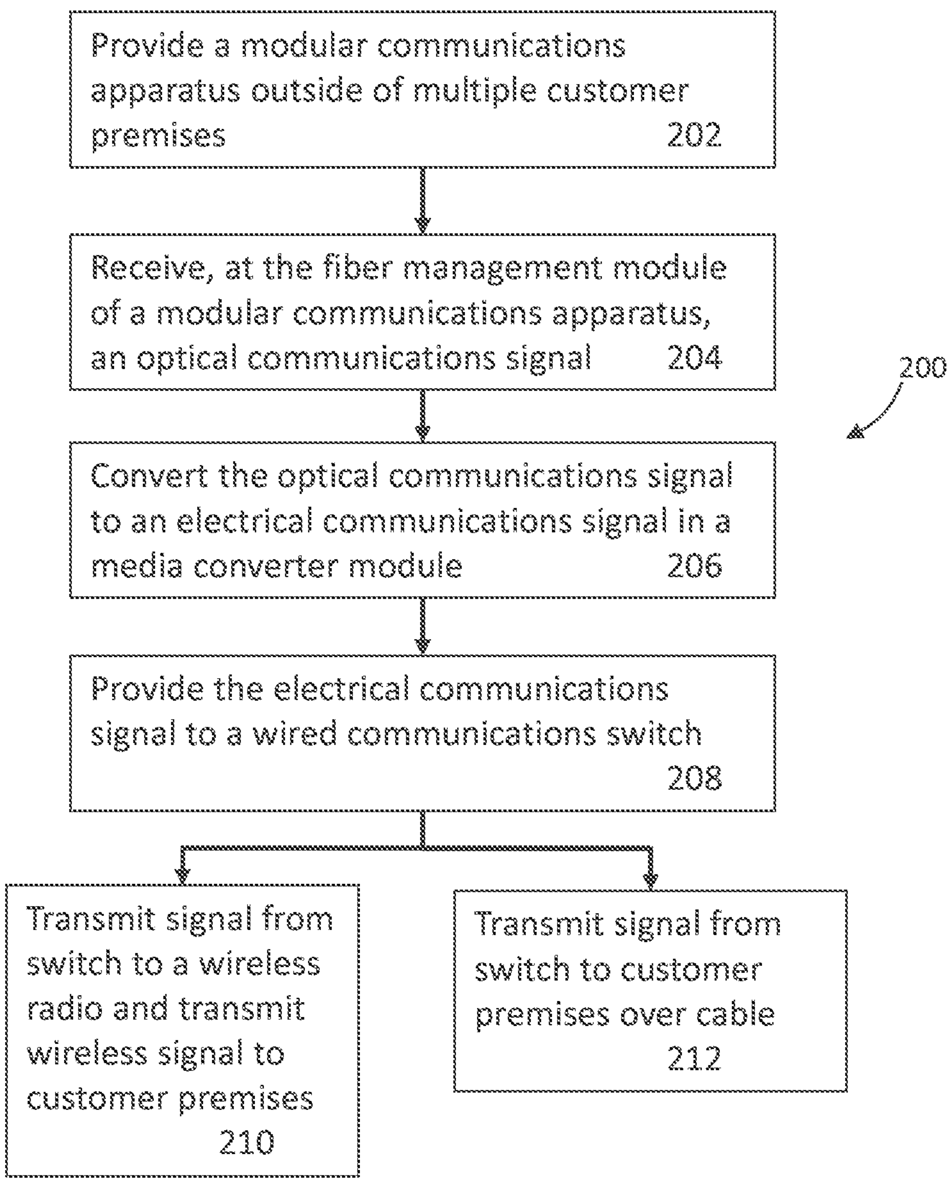
FIG. 9 is a process flow diagram illustrating a method of distributing communication signals from a provider to multiple customer premises.

As shown in FIG. 9, the apparatuses and systems described above may be used to implement a method 200 of distributing communication signals from a provider to multiple customer premises. The method may include but is not limited to the steps of providing a modular communications apparatus 100 as described above outside of multiple customer premises (step 202). The method may further include receiving, at the fiber management module of a modular communications apparatus, an optical communications signal (step 204). The optical communications signal may then be converted to an electrical communications signal in a media converter module (step 206). The electrical communications signal will be provided to a wired communications switch (step 208). From the switch, the electrical communications signal may be provided to one or more wireless communications radios and transmitted to wireless devices or networks located within multiple customer premises, step (210). In addition or alternatively, the electrical communications signal may be transmitted directly to one or more devices located within customer premises over a cable, wire or other electrical pathway (step 212). In certain instances, an optical communications signal may be transmitted from the fiber management module directly to one or more devices receiving optical input located within customer premises.

Figure 10:
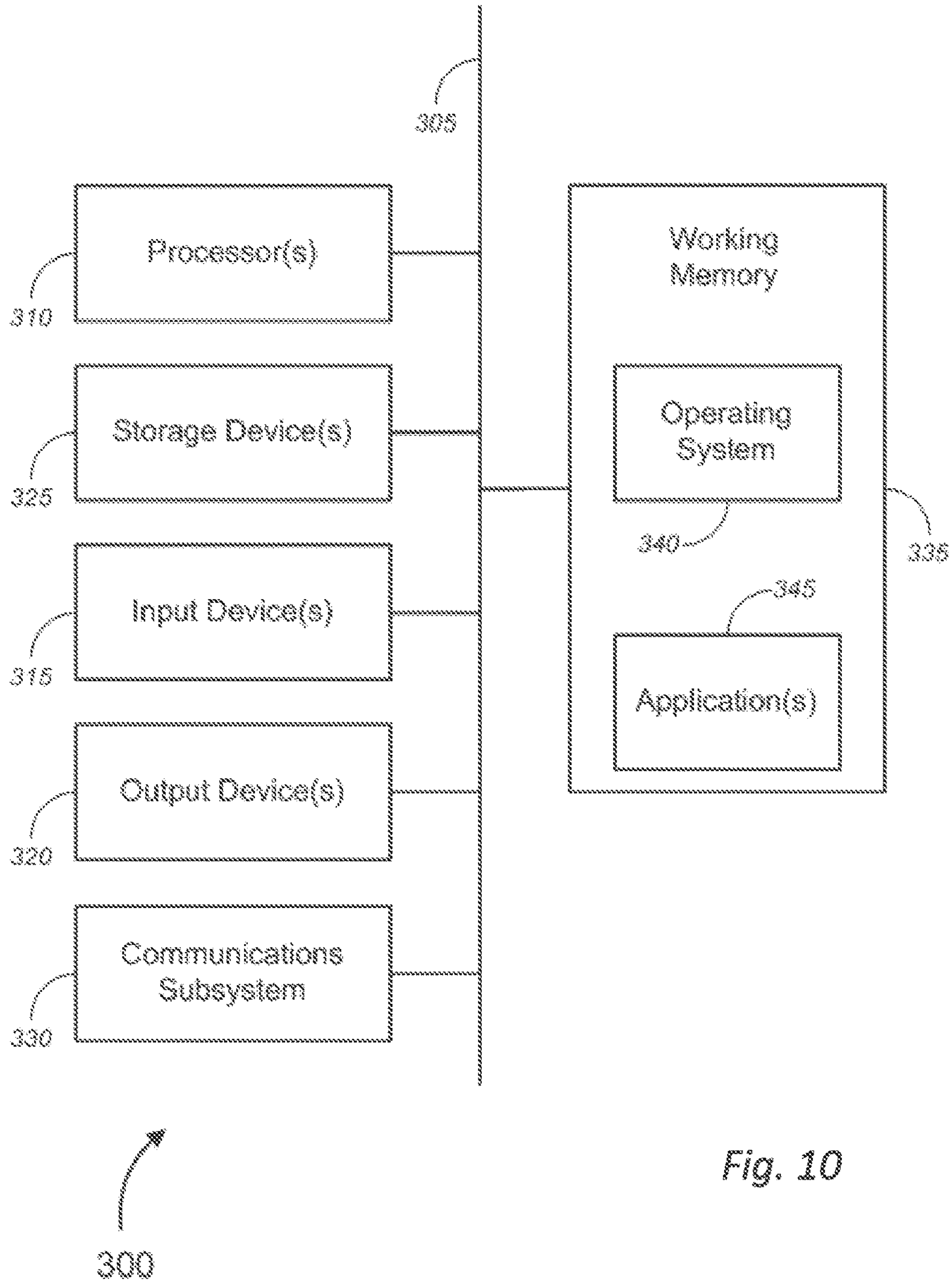
FIG. 10 is a generalized schematic diagram illustrating a computer system, in accordance with various embodiments.

In certain embodiments the system of modular communications apparatuses or individual communications pillars may be controlled using a centralized computer system. In addition, the disclosed methods may be implemented using a computer system. FIG. 10 provides a schematic illustration of one embodiment of a computer system 300 that can perform the methods provided by various other embodiments, as described herein, and/or can function as the processing system of one or more modular communications apparatuses. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, a WiFi device implemented on an 802.11 standard, a WiMax device implemented on an IEEE 802.16 standard, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A modular communications apparatus comprising:
- a housing comprising multiple vertically stacked housing modules, wherein at least a first housing module of the vertically stacked housing modules is transparent to radio frequencies;
- a communications radio transceiver located within a second housing module of the multiple vertically stacked housing modules separate from the first housing module;
- a power converter module within one of the multiple vertically stacked housing modules, wherein the power converter module is configured to receive input power from at least one of a local power feed, power from a customer premises and power over a network;
- an antenna, coupled to the communications radio transceiver, located within the first housing module; and
- a base supporting the multiple vertically stacked housing modules.

2. The modular communications apparatus of claim 1 where only the uppermost housing module is transparent to radio frequencies.

3. The modular communications apparatus of claim 2 further comprising multiple integrated height extension joints connecting adjacent housing modules.

4. The modular communications apparatus of claim 1 further comprising a wired communications switch within a housing module, having a wired signal output, wherein the wired communications switch comprises at least one of an Ethernet switch and a mini D-SLAM.

5. The modular communications apparatus of claim 1 further comprising a fiber management module within one of housing modules configured to receive an optical communications signal input, wherein the fiber management module is further configured to provide optical communications output over an optical fiber.

6. The modular communications apparatus of claim 1, wherein the communications radio comprises at least one of a WiFi radio, an LTE radio, a VDSL2 radio, a G fast radio and an ONU radio.

7. A method of distributing communications signals comprising:
- providing a modular communications apparatus comprising;
  - a housing comprising multiple vertically stacked housing modules, wherein at least a first housing module of the vertically stacked housing modules is transparent to radio frequencies;
  - a communications radio transceiver located within a second housing module of the multiple vertically stacked housing modules separate from the first housing module;

an antenna located within the first housing module, the antenna being in electronic communication with the communications radio transceiver; and a base supporting the multiple vertically stacked housing modules;

providing power to the communications radio from a power converter module;

providing input power to the power converter module from at least one of a local power feed, power from a customer premises, and power over a network; and transmitting a wireless communications signal from the communications radio, through the antenna.

8. The method of claim 7 further comprising:

providing multiple vertically stacked housing modules where only the uppermost housing module is transparent to radio frequencies; and selecting the height of the antenna by adding or removing housing modules from the housing.

9. The method of claim 7 further comprising providing a wired communications switch comprising at least one of an Ethernet switch and a mini D-SLAM.

10. The method of claim 7 further comprising providing an optical communications signal from a communications output of a fiber management module.

11. The method of claim 7 further comprising providing a communications radio comprising at least one of a WiFi radio, an LTE radio, a VDSL2 radio, a G fast radio and an ONU radio.

12. A communications system comprising:

multiple modular communications apparatuses, with each modular communications apparatus comprising:

a housing comprising multiple vertically stacked housing modules, wherein at least a first housing module of the vertically stacked housing modules is transparent to radio frequencies;

a communications radio transceiver located within a second housing module of the multiple vertically stacked housing modules separate from the first housing module;

a power converter module within one of the multiple vertically stacked housing modules, wherein the power converter module is configured to receive input power from at least one of a local power feed, power from a customer premises and power over a network;

an antenna, coupled to the communications radio transceiver, located within the first housing module;

a fiber management module within one of the housing modules configured to receive an optical communications signal input; and a base supporting the multiple vertically stacked housing modules; and an optical fiber network providing the optical communications signal to the fiber management module of each modular communications apparatus.

13. The communications system of claim 12 further comprising:

a multifiber optical cable transmitting the optical communications signal to an optical splitter; and branch optical fibers transmitting the optical communications signal from the optical splitter to multiple modular communications apparatuses.

14. The communications system of claim 13 further comprising at least one lateral optical fiber transmitting the optical communications signal from the fiber management module of a first modular communications device to the fiber management module of a second modular communications device.

15. The communications system of claim 12 wherein at least one modular communications apparatus further comprises multiple vertically stacked housing modules where only the uppermost housing module is transparent to radio frequencies.

16. The communications system of claim 12 wherein the fiber management module provides optical communications output over an optical fiber.

* * * * *